United States Patent [19]

Milan

[11] 4,399,725

[45] Aug. 23, 1983

[54] METHOD AND APPARATUS FOR CUTTING PLASTIC MATERIALS

[75] Inventor: Ernest A. Milan, Stow, Ohio

[73] Assignee: The Goodyear Tire & Rubber Company, Akron, Ohio

[21] Appl. No.: 264,007

[22] Filed: May 15, 1981

[51] Int. Cl.³ .......................... B26D 7/02; B26D 7/08
[52] U.S. Cl. ......................................... 83/17; 83/176; 83/454; 83/466.1; 83/581
[58] Field of Search ................. 83/17, 18, 20, 13, 176, 83/380, 454, 466.1, 581

[56] References Cited

U.S. PATENT DOCUMENTS

| | | | |
|---|---|---|---|
| 2,293,721 | 8/1942 | Engler | 83/176 X |
| 2,539,240 | 1/1951 | Firestone | 83/176 X |
| 4,213,385 | 7/1980 | Dahlem | 83/176 X |

Primary Examiner—Frank T. Yost
Attorney, Agent, or Firm—Frederick J. Lacher; T. P. Lewandowski

[57] ABSTRACT

A strip of plastic material is cut by clamping the strip and then moving a cutting blade from a retracted position to a first position in cutting engagement with the strip. Simultaneously a supporting blade in overlapping relation with the cutting blade is moved to the first position for lifting the strip. The movement of the supporting blade stops at the first position and the cutting blade movement is continued through the strip. The cutting surface of the cutting blade is recessed adjacent the cutting edge so that upon movement of the cutting blade the contact with the strip is minimized to prevent the formation of burrs on the severed ends of the strip. After the strip is severed the cutting blade is retracted to the first position. From the first position, the cutting blade and supporting blade are moved to a fully retracted position and the strip unclamped so that the severed portion of the strip can be removed and the remaining portion of the strip moved into position for the next cut.

20 Claims, 6 Drawing Figures

METHOD AND APPARATUS FOR CUTTING PLASTIC MATERIALS

This invention relates, generally, to the cutting of plastic material and especially to the cutting or skiving of an unvulcanized rubber compound suitably shaped in cross section for use in forming treads of pneumatic tires.

In the manufacture of tires the tread material, which may be extruded, is fed to a cutting apparatus by a suitable conveyor. In the past the strip has been cut to length at a bevel by rotary knives or by a guillotine-type cutter inclined at an angle of about 45 degrees to the bottom surface of the strip so that when the tread is applied to the tire carcass on a tire building machine drum the ends may be overlapped and spliced.

One of the difficulties encountered has been the formation of burrs or raised edges at the edges of the cut ends of the strips due to the movement of the knife blades along the cut surfaces. These burrs or raised edges can cause defective tires because of the difficulty in splicing the cut ends of the tread strips.

The present invention is directed to a method and apparatus for cutting a strip of plastic material by utilizing a clamping member and a knife assembly including a cutting blade and an overlapping supporting blade which move together into cutting and lifting engagement with the strip. The cutting blade continues to move through the strip and has a recessed surface so that the contact with the clamped cut end of the strip is kept to a minimum and the formation of burrs is substantially prevented. The upward movement of the cutting blade and supporting blade is also cutting in a direction to push the unclamped cut end away from the cutting blade so that the contact with the unclamped cut end is kept to a minimum and the formation of burrs at that end is also prevented.

In accordance with one aspect of this invention there is provided an apparatus for cutting a strip of plastic material comprising a supporting structure containing a passage having a supporting surface for the strip, a knife assembly positioned in the structure under the passage, a shearing block mounted on the structure at the upper side of the passage, a clamping member positioned in the structure adjacent the knife assembly and movable toward the passage into engagement with the strip for pressing the strip against the shearing block, the knife assembly including a cutting blade and a supporting blade, the supporting blade being in overlapping relation with the cutting blade, means for moving the cutting blade and the supporting blade an initial amount toward the shearing block from a retracted position to a first position, means to move said cutting blade beyond said supporting blade into shearing engagement with the shearing block and means to retract the cutting blade and the supporting blade to the retracted position.

In accordance with another aspect of this invention there is provided a method of cutting a strip of plastic material having top and bottom sides comprising the steps of (a) clamping the strip in a supporting structure at a position next to the position where the strip is to be cut;

(b) moving a cutting blade from a retracted position a predetermined initial amount to a first position in cutting engagement with the strip at the bottom side;

(c) moving a supporting blade and the cutting blade from the retracted position alongside the cutting blade to the first position in lifting engagement with the bottom side of the strip;

(d) moving the cutting blade from the first position completely through the strip while the supporting blade is in lifting engagement with the strip in the first position;

(e) retracting the cutting blade and the supporting blade to the retracted position; and (f) unclamping the strip for movement of the strip away from the cutting blade.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
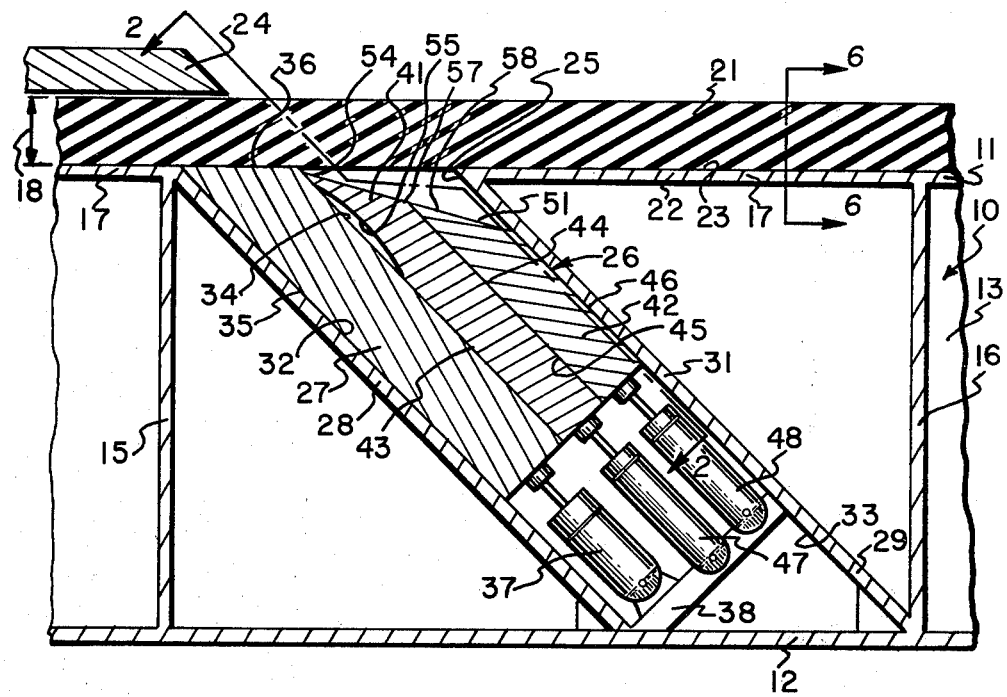
FIG. 1 is a schematic sectional view of the cutting apparatus taken along line 1—1 in FIG. 2 showing the plastic strip in place prior to cutting, with parts being broken away.
Figure 2:
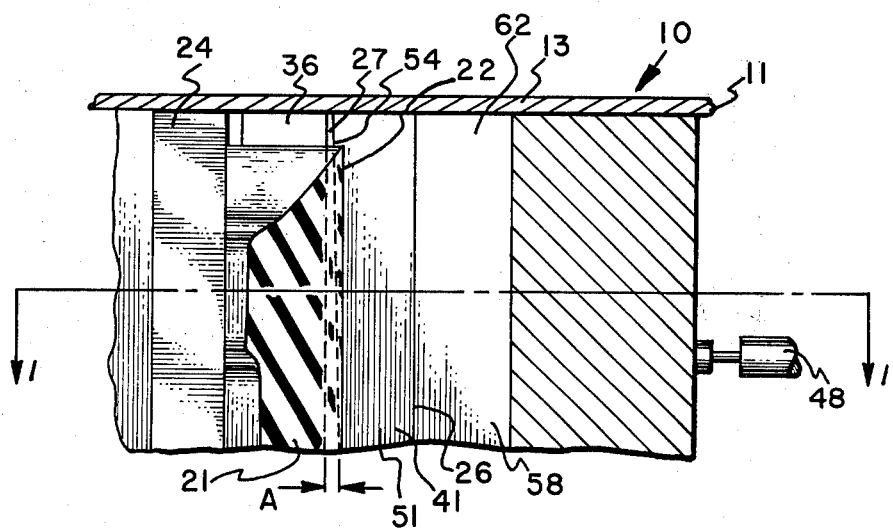
FIG. 2 is a fragmentary sectional view of the cutting apparatus and plastic strip taken along line 2—2 in FIG. 1.
Figure 6:
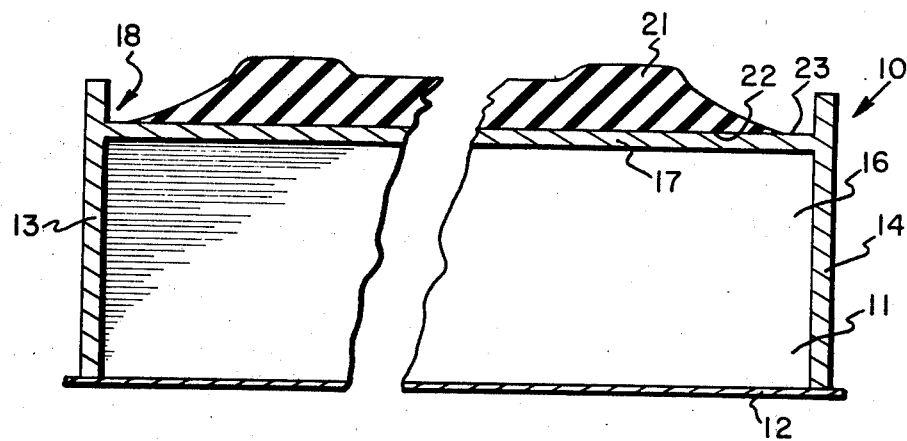
FIG. 6 is a sectional view taken along the line 6—6 in FIG. 1 with parts being broken away.

Referring to FIGS. 1, 2 and 6, an apparatus for cutting a strip of plastic material such as a tread skiver 10 is shown. The tread skiver 10 has a supporting structure 11 which may be of fabricated steel and include a base plate 12, side plates 13 and 14, and transverse plates 15 and 16. Extending between the side plates 13 and 14 is a supporting plate 17 defining a passage 18 for accommodating a strip 21 of plastic material which may be of uncured rubber having a cross-sectional shape, as shown in FIG. 6, suitable for the tread of a vehicle tire. This strip 21 may be conveyed to the tread skiver 10 by a suitable conveyor such as a belt (not shown) and positioned in the passage 18 with a bottom side 22 supported on a supporting surface 23 of the supporting plate 17. Extending over the top of the passage 18 at one end of the supporting structure 11 is a shearing block 24 supported by the side plates 13 and 14.

Figure 3:
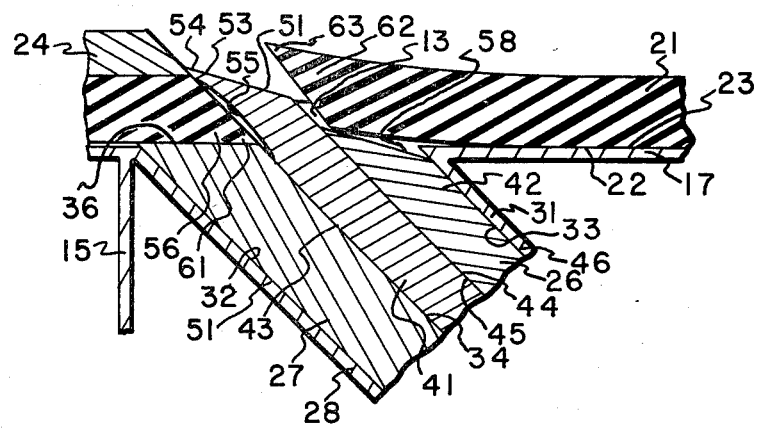
FIG. 3 is a fragmentary sectional view like FIG. 1 showing the plastic strip in the clamped position after the cutting blade has cut through the strip.
Figure 4:
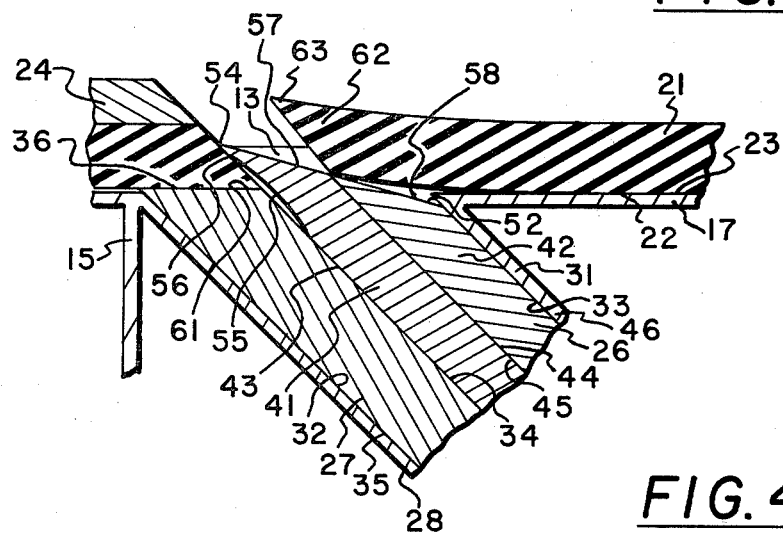
FIG. 4 is a fragmentary sectional view like FIG. 3 showing the knife assembly with the cutting blade retracted to the first position in alignment with the supporting blade.

The supporting plate 17 has an opening 25 below which a knife assembly 26 and a clamping member such as clamping plate 27 are positioned. The supporting structure 11 has a pair of inclined plates 28 and 31 connected to the side plates 13 and 14 and extending from the base plate 12 to the supporting plate 17 in parallel relationship. The clamping plate 27 and knife assembly 26 are supported between a sloped surface 32 on inclined plate 28 and a sloped surface 33 on inclined plate 31. Preferably the inclined plates 28 and 31 are at an angle of about 45 degrees in the supporting surface 23 of the supporting plate 17 so that the clamping plate 27 and knife assembly 26 will be movable in a direction inclined 45 degrees to the supporting surface as shown in FIGS. 3, 4 and 6.

The clamping plate 27 is substantially rectangular in shape with a upper surface 34 which is substantially parallel to a lower surface 35 in sliding engagement with the sloped surface 32 of inclined plate 28. A clamping surface 36 at the upper end of the clamping plate 27 is inclined to conform with the bottom side 22 of the strip 21. The clamping plate 27 may be moved into and out of clamping engagement with the strip 21 by suitable means such as a piston and cylinder assembly 37 connected to the lower edge of the clamping plate and to a supporting beam 38 extending between the inclined plates 28 and 31. The piston and cylinder assembly 37 may be connected to a suitable source of fluid pressure such as air pressure available in a tire plant.

The knife assembly 26 includes a cutting blade 41 and a supporting blade 42 positioned in overlapping relationship between the upper surface 34 of the clamping plate 27 and the sloped surface 33 of the inclined plate 31. The cutting blade 41 is generally rectangular in shape with a cutting surface 43 in substantially parallel relationship with an upper surface 44. The supporting blade 42 has a lower surface 45 in substantially parallel relationship to an upper surface 46. As shown in FIG. 1, the cutting surface 43 of the cutting blade 41 is in sliding engagement with the upper surface 34 of the clamping plate 27. The upper surface 44 of the cutting blade 41 is in sliding engagement with the lower surface 45 of the supporting blade 42 and the upper surface 46 of the supporting blade is in sliding engagement with the sloped surface 33 of the inclined plate 31. The cutting blade 41 is movable into and out of engagement with the strip 31 by suitable means such as a piston and cylinder assembly 47 connected to a lower edge of the blade. The supporting blade 42 is movable into and out of engagement with the strip 21 by suitable means such as a piston and cylinder assembly 48 connected to a lower edge of the blade. The piston and cylinder assemblies 47 and 48 are also connected to the supporting beam 38 of the supporting structure 11. Preferably the piston and cylinder assemblies 47 and 48 for the cutting blade 41 and supporting blade 42 are actuated by hydraulic fluid means controlled by suitable automatic controls (not shown) providing predetermined movement of the cutting blade and supporting blade between a retracted position 51, shown in FIGS. 1 and 5, a first position 52, shown in FIG. 4, and a fully extended position 53, shown in FIG. 3.

The cutting blade 41 has a cutting edge 54 which may be slanted at an angle A (FIG. 2) of about two or three degrees to the plane of the supporting surface 23 for cutting engagement with the bottom side 22 of the strip 21. The cutting surface 43 of the cutting blade 41 may have a recess 55 extending from a position below the cutting edge 54 a distance substantially greater than the thickness of the strip 21 so that contact with clamped cut end 56 of the strip is minimized during the cutting operation.

Figure 5:
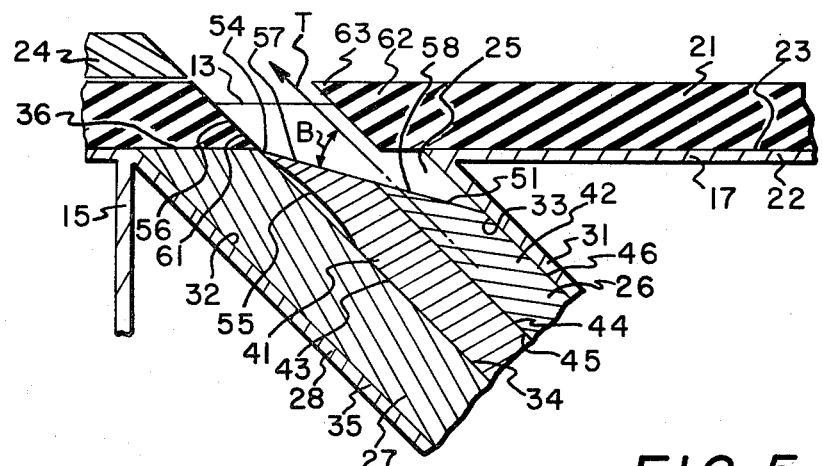
FIG. 5 is a fragmentary sectional view like FIGS. 3 and 4 showing the knife assembly and clamping plate in the fully retracted position.

As shown in FIG. 5, the cutting blade 41 and supporting blade 42 have leading faces 57 and 58, respectively, which are inclined to the direction of travel T, shown by the arrow in FIG. 5, at substantially the same angle B of approximately 30 degrees.

In operation, the plastic strip 21, which may be an extruded tread of uncured rubber in a semi-plastic condition, is positioned on the supporting surface 23 in the passage 18 as shown in FIGS. 1 and 6. The piston and cylinder assembly 37 for the clamping plate 27 is actuated to move the clamping plate upward in the direction T so that the clamping surface 36 engages the bottom side 22 of the strip 21 and urges the strip into engagement with the shearing block 24 as shown in FIG. 3. The piston and cylinder assemblies 47 and 48 for the cutting blade 41 and supporting blade 42 are then actuated and move the cutting blade and supporting blade simultaneously upward from the retracted position 51, shown in FIG. 1, a predetermined initial amount to a first position 52, not shown but corresponding to the position of the blades shown in FIG. 4. At this first position 52 during the upward movement the cutting edge 54 is in cutting engagement with the strip 21 at the bottom side 22 and the leading face 58 of the supporting blade 42 is in lifting engagement with the bottom side 22 of the strip 21.

The upward movement of the supporting blade 42 is discontinued at the first position 52 and the upward movement of the cutting blade 41 is continued through the strip 21 into shearing engagement with the shearing block 24 as shown in FIG. 3. Due to the movement of the cutting blade 41 in a direction T inclined at an angle of about 45 degrees to the bottom side 22 of the strip 21, the clamped cut end 56 is beveled providing a lower edge 61. At the same time unclamped cut end 62 of the strip 21 is provided with a beveled surface having an upper edge 63.

During the upward movement of the cutting blade 41 and the supporting blade 42, the unclamped cut end 62 is pushed away from the cutting blade so that the upper edge 63 is spaced from the cutting blade as shown in FIG. 3. The recess 55 in the cutting surface 43 is positioned so that upon upward movement of the cutting blade 41 the lower edge 61 of the clamped cut end 56 is in spaced relation with the cutting surface to eliminate or reduce the dragging force on the lower edge which might cause a burr or upturning of that edge.

After the cutting blade 41 has severed the clamped cut end 56 from the unclamped cut end 62, as shown in FIG. 3, the piston and cylinder assembly 47 for the cutting blade is actuated to retract and move the cutting blade downward to the first position 52, shown in FIG. 4. During this retraction the upper edge 63 of the unclamped cut end 62 is spaced from the cutting blade 41 to reduce or eliminate any dragging forces on the upper edge which might cause burrs or downturning of that edge. After the cutting blade 41 has been retracted to the first position 52, shown in FIG. 4, the piston and cylinder assembly 48 is actuated and the cutting blade 41 and supporting blade 42 are moved downward to the retracted position 51, shown in FIG. 5. At the same time the piston and cylinder assembly 37 may be actuated to retract the clamping plate 27.

The strip 21 may then be moved to a position for the next cut. If desired, the downward movement of the clamping plate 27 to a retracted position may take place after the cutting blade 41 has been moved upwardly completely through the strip 21 and before the cutting blade is retracted and moved downwardly to the first position 52. This avoids dragging movement of the blade along the clamped cut end 56; however, when the cutting blade 41 is retracted before the clamped cut end is moved out of the passage 18, the only dragging force on the lower edge 61 of the clamped cut end is in a direction downward and away from the lower edge 61 which movement is not likely to cause a burr or undesirable turning up of that edge.

In this embodiment, only one supporting blade 42 is shown; however, it is contemplated that where additional lifting of the strip 21 is needed, additional supporting blades may be positioned between the supporting blade 42 and the surface 33 of the inclined plate 31. The angle B between the leading surfaces 57 and 58 of the cutting blade 41 and supporting blade 42 may also be increased or decreased to provide the necessary lifting and pushing of the unclamped cut end 62 during operation.

In the embodiment shown, the thickness of the cutting blade 41 is substantially the same as the thickness of the supporting blade 42; however, the thickness of the cutting blade may be reduced for better cutting efficiency and the thickness of the supporting blade increased to limit the deflection and deformation of the cutting blade during operation.

Even though a certain representative embodiment and details have been shown for the purpose of illustrating the invention, it will be apparent to those skilled in the art that various changes and other modifications may be made therein without departing from the invention.

What is claimed is:

1. Apparatus for cutting a strip of plastic material comprising a supporting structure containing a passage having a supporting surface for said strip, a knife assembly positioned in said structure under said passage, a shearing block mounted on said structure at the opposite side of said passage, a clamping member positioned in said structure adjacent said knife assembly and movable toward said passage into engagement with said strip for pressing the strip against said shearing block, said knife assembly including a cutting blade and a supporting blade, said supporting blade being in overlapping relation with said cutting blade, means for moving said cutting blade and said supporting blade an initial amount toward said shearing block from a retracted position to a first position, means to move said cutting blade beyond said supporting blade into shearing engagement with said shearing block and means to retract said cutting blade and said supporting blade to said retracted position.

2. Apparatus according to claim 1 wherein said supporting blade and said cutting blade have leading faces with substantially the same inclination to the direction of travel of the blades.

3. Apparatus according to claim 1 wherein said cutting blade has a cutting edge and a cutting surface in sliding engagement with said clamping member and said cutting surface being recessed so that the contact with the cut end of said strip is minimized.

4. Apparatus according to claim 1 wherein said initial amount of movement of said supporting blade is sufficient to lift an unclamped end of said strip in said passage to maintain said unclamped end substantially out of contact with said cutting blade during retraction of said cutting blade to said first position after severing said strip.

5. Apparatus according to claim 1 wherein said cutting blade is movable in a direction inclined to said supporting surface of said passage for providing beveled ends of said strip.

6. Apparatus according to claim 5 wherein said supporting structure has a sloped surface for supporting said clamping member, said cutting blade and said supporting blade at said inclination to said supporting surface of said passage.

7. Apparatus according to claim 1 wherein said cutting blade is movable in a direction inclined to said supporting surface so that the cut ends of said strip are beveled, said supporting blade being movable in substantially the same direction as said cutting blade from said retracted position to said first position to lift said strip, said cutting blade having a cutting edge and a cutting surface, said cutting blade cutting a clamped cut end of said strip having a lower edge and an unclamped cut end having an upper edge, said cutting blade being recessed so that upon upward movement of said cutting blade said lower edge is in spaced relation with said cutting surface to reduce dragging forces on said lower edge which may cause burrs.

8. Apparatus according to claim 7 wherein said upward movement of said cutting blade and said supporting blade is in a direction to push said unclamped cut end away from said cutting blade positioning said upper edge in spaced relation to said cutting blade for reducing dragging forces on said upper edge which might cause burrs.

9. Apparatus according to claim 1 wherein said cutting blade is movable in a direction inclined to said supporting surface so that the cut ends of said strip are beveled, said supporting blade being movable is substantially the same direction as said cutting blade from said retracted position to said first position to lift said strip, said cutting blade having a cutting edge and a cutting surface, said cutting blade cutting a clamped cut end of said strip having a lower edge and an unclamped cut end having an upper edge, said upward movement of said cutting blade and said supporting blade being in a direction to push said unclamped cut end away from said cutting blade so that said upper edge is spaced from said cutting blade to reduce dragging forces on said upper edge which might cause burrs.

10. Apparatus according to claim 1 wherein said clamping member is actuated by a piston and cylinder assembly.

11. Apparatus according to claim 10 wherein said piston and cylinder assembly is actuated by air pressure.

12. Apparatus according to claim 1 wherein said means for moving said cutting blade and said supporting blade include piston and cylinder assemblies connected to said supporting structure and to the blades.

13. A method of cutting a strip of plastic material having top and bottom sides comprising the steps of
   (a) clamping said strip in a supporting structure at a position next to the position where the strip is to be cut,
   (b) moving a cutting blade from a retracted position a predetermined initial amount to a first position in cutting engagement with said strip at said bottom side,
   (c) moving a supporting blade from said retracted position alongside said cutting blade to said first position in lifting engagement with said bottom side of said strip,
   (d) moving said cutting blade from said first position completely through said strip while said supporting blade is in lifting engagement with said strip in said first position,
   (e) retracting said cutting blade and said supporting blade to said retracted position, and
   (f) unclamping said strip for movement of said strip away from said cutting blade.

14. The method according to claim 13 wherein said supporting blade is moved simultaneously with said cutting blade from said retracted position to said first position.

15. The method according to claim 13 wherein said cutting blade is retracted to said first position and then further retracted with said supporting blade to said retracted position.

16. The method according to claim 13 wherein said unclamping of said strip takes place after the moving of said cutting blade completely through said strip and before retracting said cutting blade.

17. The method of claim 13 wherein said unclamping of said strip takes place after said cutting blade and said supporting blade are moved to said retracted position.

18. The method of claim 13 wherein said cutting blade is moved in a direction inclined to said bottom side of said strip so that the cut ends of said strip are beveled providing a clamped cut end of said strip with a lower edge and an unclamped cut end with an upper edge, said cutting blade being recessed so that upon upward movement of said cutting blade said lower edge is in spaced relation with said cutting surface to reduce dragging force on said lower edge which might cause burrs.

19. The method of claim 18 wherein said cutting blade and said supporting blade are moved upwardly in a direction to push said unclamped cut end away from said cutting blade so that said upper edge is spaced from said cutting blade to reduce dragging forces on said upper edge which might cause burrs.

20. The method of claim 13 wherein said cutting blade is moved in a direction inclined to said bottom side of said strip so that the cut ends of said strip are beveled providing a clamped cut end of said strip with a lower edge and an unclamped cut end with an upper edge, moving said cutting blade and said supporting blade upwardly in a direction to push said unclamped cut end away from said cutting blade so that said upper edge is spaced from said cutting blade to reduce dragging forces on said upper edge which might cause burrs.

* * * * *

UNITED STATES PATENT OFFICE
CERTIFICATE OF CORRECTION

Patent No. 4,399,725  Dated August 23, 1983

Inventor(s) Ernest A. Milan

It is certified that error appears in the above-identified patent and that said Letters Patent are hereby corrected as shown below:

Column 3, line 2, "6" should read --5--;

line 4, "a upper" should read --an upper--;

line 34, "31" should read --21--.

Column 6, line 25, "is" should read --in--.

Signed and Sealed this

Tenth Day of January 1984

[SEAL]

Attest:

Attesting Officer

GERALD J. MOSSINGHOFF

Commissioner of Patents and Trademarks